United States Patent [19]

Beebe

[11] Patent Number: 4,845,952

[45] Date of Patent: Jul. 11, 1989

[54] MULTIPLE VENTURI TUBE GAS FUEL INJECTOR FOR CATALYTIC COMBUSTOR

[75] Inventor: Kenneth W. Beebe, Galway, N.Y.

[73] Assignee: General Electric Company, Schenectady, N.Y.

[21] Appl. No.: 112,973

[22] Filed: Oct. 23, 1987

[51] Int. Cl.[4] ............................ F02C 3/22; F02C 7/22

[52] U.S. Cl. ........................................ 60/737; 60/723; 60/739

[58] Field of Search ................. 60/723, 737, 738, 748, 60/739, 39.465, 740, 746; 239/533.2, 434.5

[56] References Cited

U.S. PATENT DOCUMENTS

| | | | |
|---|---|---|---|
| 3,472,025 | 10/1969 | Simmons et al. | 60/739 |
| 3,691,762 | 9/1972 | Ryberg et al. | 60/737 |
| 4,047,877 | 9/1977 | Flanagan . | |
| 4,050,238 | 9/1977 | Holzapfel | 60/737 |
| 4,356,698 | 11/1982 | Chamberlain | 60/737 |
| 4,534,165 | 8/1985 | Davis, Jr. et al. . | |
| 4,589,260 | 5/1986 | Krockow | 60/737 |
| 4,763,481 | 8/1988 | Cannon | 60/737 |

OTHER PUBLICATIONS

NASA Conference Publication 2078 Premixed Prevaporized Combustor Technology Forum, Lewis Research Ctr., Cleveland, Ohio.

1/9-10, 1979, "Performance Of A Multiple Venturi Fuel-Air Preparation System," Robert R. Tacina, Lewis Research Ctr.

*Primary Examiner*—Louis J. Casaregola
*Assistant Examiner*—Timothy S. Thorpe
*Attorney, Agent, or Firm*—Jerome C. Squillaro

[57] ABSTRACT

A fuel gas injector for a gas turbine engine employs a plurality of closely spaced parallel venturi tubes disposed in a pair of spaced-apart header plates. The venturi tubes are brazed to the header plates and the perimeters of the header plates are sealed to form a plenum into which pressurized gaseous fuel is supplied. Orifices lead from the plenum to throats of the venturi tubes thereby injecting the gaseous fuel at right angles into the high-velocity air stream existing at the throats of the venturi tubes. High shear is imposed on the injected fuel for providing complete mixing with the air. The high air velocity in the throats of the venturi tubes avoids flashback and flameholding. The combined flow from the plurality of venturi tubes mixes downstream thereof to provide a uniform velocity and fuel-air mixture across the flow field. This flow field is suitable for use in a catalyst bed which may be disposed downstream of the venturi tubes.

8 Claims, 3 Drawing Sheets

MULTIPLE VENTURI TUBE GAS FUEL INJECTOR FOR CATALYTIC COMBUSTOR

BACKGROUND OF THE INVENTION

The present invention relates to techniques for preparing a fuel-air mixture for combustion in an engine.

A present thrust of gas-turbine engine technology seeks to attain reduced emissions of nitrogen (NOx) and hydrocarbon compounds. Prior-art techniques for accomplishing such reduced emissions almost invariably result in reduced thermodynamic efficiency or substantially increased capital costs.

NOx compounds are produced by reaction of the nitrogen in the air at elevated temperatures conventionally found in the combustors of a gas turbine engine. NOx formation can be reduced by reducing the maximum flame temperature in the combustor. Injection of steam into the combustor reduces the maximum flame temperature in the combustor at the cost of thermodynamic efficiency. Penalties must also be paid in water use, and water treatment capital and operating costs. The amount of steam injection, and its attendant costs, rises with the amount of NOx reduction desired. Some states and foreign countries have announced targets for NOx reduction that infer such large quantities of steam that this solution appears less desirable for future systems.

NOx compounds can be removed from the exhaust downstream of a gas turbine engine by mixing a reagent such as, for example, ammonia, with the exhaust stream and passing the resulting mixture through a catalyst before venting to the atmosphere. The catalyst encourages the reaction of the NOx compounds with the reagent to produce harmless components. This technique, although successful in reducing NOx compounds to target levels, requires substantial additional capital outlay for the catalyst bed, a larger exhaust system to provide room for the large catalyst bed and spray bars to deliver the reagent into the exhaust stream. The ongoing cost of large quantities of the reagent must also be borne.

The maximum flame temperature can be reduced without steam injection using catalytically supported combustion techniques. A fuel-air mixture is passed through a porous catalyst within the combustor. The catalyst permits complete combustion to take place at temperatures low enough to avoid NOx formation. Several U.S. patents such as, for example, U.S. Pat. Nos. 4,534,165 and 4,047,877, illustrate combustors having catalytically supported combustion.

Reduction or elimination of hydrocarbon emissions is attainable by ensuring complete combustion of the fuel in the combustor. Complete combustion requirês a lean fuel-air mixture. As the fuel-air mixture is made leaner, a point is reached at which combustion can no longer be supported. The presence of a catalyst also permits combustion of leaner fuel-air mixtures than is possible without the catalyst. In this way, catalytically supported combustion aids in reducing both types of environmental pollution.

A critical problem, not completely solved by the referenced prior-art patents, is attaining a uniform flow field of fuel-air mixture across the entire face of a catalyst bed. That is, the fuel-air mixture and the gas velocity vary across the face of the catalyst bed, resulting in uneven combustion across the catalyst. This reduces combustor efficiency and can permit unburned hydrocarbons to escape to the exhaust.

In the referenced '877 patent, for example, liquid fuel and air are injected into a chamber upstream of the catalyst bed. The fuel-air mixture then flows through the catalyst bed, wherein the fuel and air react. As pointed out in this patent, unburned fuel may exit the catalyst. A gas-fuel burner downstream of the catalyst is relied on to burn this unburned liquid fuel.

The '165 patent breaks up the catalytic bed into concentric zones, each having its own liquid fuel and air supply. Although the patent proposes that the advantage of breaking the catalytic bed and fuel-air supply into zones is found in the resulting ability to stage fuel to the individual zones, it might be presumed that the resulting smaller area of catalytic bed fed by each fuel-air supply device may improve the uniformity of fuel-air mixture reaching an enabled zone of the catalytic bed.

Further improvement in flow-field uniformity is reported in an article entitled "Performance of a Multiple-Venturi Fuel-Air Preparation system" by Robert Tacina published in *NASA Conference Publication No.* 207 held on Jan. 9 and 10, 1979 "Pre-Mixed, Pre-Vaporized Combustion Technology Forum". This article, a copy of which accompanies the present patent application, discloses a plurality of parallel venturi tubes disposed across the flow path of air leading to a catalyst bed. A vaporized liquid fuel is injected into the inlet of each venturi. In flowing through a venturi tube, the air and fuel are thoroughly mixed. The mixtures exiting all of the venturi tubes further mix together downstream of the venturi tubes to produce a flow field that is substantially uniform in velocity and fuel-air mixture across the downstream gas mixture.

The multiple-venturi tube device disclosed at the NASA conference has several drawbacks that make it unsuitable for applications envisaged for the present invention. First, the multiple venturi tubes are machined out of a single piece of metal. This is a costly way to form such a structure, and results in feather edges at the exits which may not endure in the severe operating environment of a gas turbine combustion system. Second, each venturi tube is fed liquid fuel through an individual tube of small diameter. It is foreseen that such small tubes can become clogged, rendering the affected venturi tubes inoperative. In a large device, the large number of such tubes is a reliability problem.

In addition to addressing the above drawbacks of the referenced multiple-venturi device, it is an objective of the present invention to replace liquid fuel with fuel gas. In the start-up procedure of a catalytic reactor, external heat is required until the catalytic reactor attains an operating temperature. One way of providing the external heat includes a preburner disposed upstream of the multiple-venturi tube assembly. It is believed that injecting a fuel gas into the inlet of the venturi tubes could lead to flash back to the preburner or flame holding at the inlets of the venturi tubes. Neither of these effects is desirable.

OBJECTS AND SUMMARY OF THE INVENTION

It is an object of the invention to provide a multiple-venturi tube pre-mix apparatus which overcomes the drawbacks of the prior art.

It is a further object of the invention to provide a multiple-venturi tube fuel injector including means for avoiding flash-back toward an upstream burner.

It is a still further object of the invention to provide a multiple-venturi tube fuel injector including a gas-fuel fuel manifold integrally constructed with the venturi tubes.

It is a still further object of the invention to provide a multiple-venturi tube fuel injector including means for injecting a gas fuel into the throat of each venturi tube whereby the high gas velocity existing in that location prevents flashback.

Briefly stated, the present invention provides a fuel gas injector for a gas turbine engine employing a plurality of closely spaced parallel venturi tubes disposed in a pair of spaced-apart header plates. The venturi tubes are brazed to the header plates and the perimeters of the header plates are sealed to form a plenum into which pressurized gaseous fuel is supplied. Orifices lead from the plenum to throats of the venturi tubes, thereby injecting the gaseous fuel at right angles into the high-velocity air stream existing at the throats of the venturi tubes. High shear is imposed on the injected fuel for providing complete mixing with the air. The high air velocity in the throats of the venturi tubes avoids flash-back and flameholding. The combined flow from the plurality of venturi tubes mixes downstream thereof, to provide a uniform velocity and fuel-air mixture across the flow field. This flow field is suitable for use in a catalyst bed which may be disposed downstream of the venturi tubes.

According to an embodiment of the invention, there is provided a fuel injector for a combustor of a gas turbine engine comprising: a plurality of venturi tubes disposed in the combustor, the plurality of venturi tubes including a structure forcing substantially all of an upstream gas flow to pass through the plurality of venturi tubes, each of the venturi tubes including a converging inlet section, a throat defining a narrowest portion, and a diverging diffuser section, each of the venturi tubes including at least one orifice in the throat, and means for feeding a fuel gas to the at least one orifice, whereby the fuel gas is injected into the gas flow at the throat.

According to a feature of the invention, there is provided a fuel injector for a combustor of a gas turbine engine comprising: an upstream header plate extending across a gas flow in the combustor, a downstream header plate spaced downstream of the upstream header plate, a plurality of venturi tubes passing through the upstream and downstream header plates, first means for sealing the plurality of venturi tubes to the upstream and downstream header plates, whereby the gas stream is forced to pass through the plurality of venturi tubes, second means for sealing perimeters of the upstream and downstream header plates together whereby a plenum is formed therebetween surrounding portions of the plurality of venturi tubes, means for feeding a fuel gas into the plenum, each of the venturi tubes including at least one orifice between the plenum and a central passage therethrough, whereby the fuel gas is injectable through the at least one orifice into the gas stream.

According to a further feature of the invention, there is provided a combustor for a gas turbine engine comprising: a preburner, means for feeding fuel and air to the preburner, a gas fuel injector downstream of the preburner, the gas fuel injector including a plurality of parallel venturi tubes and means for forcing substantially all of a gas flow from the preburner to flow through the venturi tubes, means for feeding a gas fuel to each of the plurality of venturi tubes, a catalyst bed downstream of the gas fuel injector, and a fuel gas and air mixture from the gas fuel injector passing through the catalyst bed and reacting combustively while passing therethrough whereby energetic gasses are emitted downstream of the catalyst bed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

A typical gas turbine engine employs a pluraity of parallel combustors disposed in a circle about an axis. A fuel-air mixture is burned in each combustor to produce a hot, energetic flow of gas. The gas from each combustor travels through a transition piece wherein the gas flow is changed from a generally circular field to a field approximating an arc of a circle. The outlets of all of the transition pieces are arranged to form a full circle leading to turbine blades of the machine. All of the above is conventional and does not require further description to enable full understanding by one skilled in the art. Accordingly, attention is focused in the remainder of the present description on a single combustor, it being understood that all combustors in a gas turbine engine are substantially identical to the one described. Only those additional portions of a gas turbine engine required for an understanding of the environment in which the combustor operates are shown and described.

Figure 1:
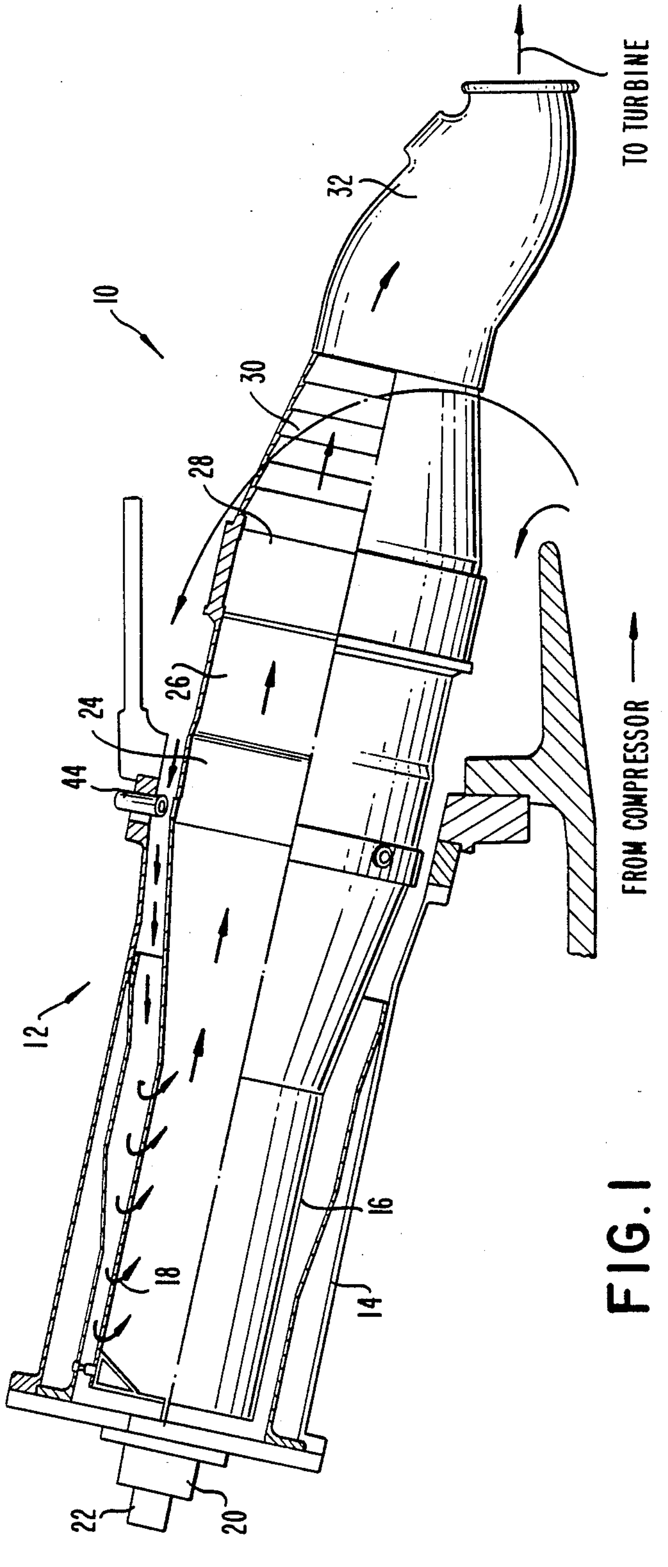
FIG. 1 is a side view, partly in cross section, of a portion of a gas turbine engine showing a combustor according to an embodiment of the invention.

Referring to FIG. 1, there is shown, generally at 10, a gas turbine engine having a combustor assembly 12 according to an embodiment of the invention. A preburner section 14 receives combustion and dilution air through a preburner liner 16, as indicated by a plurality of bent arrows 18. During startup, a preburner fuel nozzle 20 receives a flow of a fuel on a fuel line 22 for combustion in preburner section 14. Under more fully loaded conditions of gas turbine engine 10, fuel may be cut off from preburner fuel nozzle 20.

The air and products of combustion in preburner section 14 flow through a multiple-venturi tube gas fuel injector 24 wherein additional fuel is added to the flow field before it passes into a fluid momentum mixing section 26. As will be further detailed, multiple-venturi tube gas fuel injector 24 includes a plurality of parallel venturi tubes to enhance vigorous mixing of air and added fuel. The mixture entering fluid momentum mixing section 26 from the plurality of venturi tubes is further mixed together as it travels along fluid momentum mixing section 26 until it reaches a catalyst bed 28. As the fuel-air mixture passes through catalyst bed 28, a combustion reaction takes place, catalyzed by catalyst material in catalyst bed 28. The resulting hot, energetic gasses exiting catalyst bed 28 pass through a reaction zone 30 before being turned and shaped in a transition piece 32 for delivery to a turbine (not shown).

The length and shape of preburner section 14 depends on the type of fuel to be used for preburner heating. The embodiment shown is suitable for use with natural gas in preburner fuel nozzle 20. This should not be taken to exclude the use of other gaseous fuels or liquid fuel in preburner section 14. If such other fuels are used in preburner section 14, one skilled in the art would recognize that suitable modifications in, for example, shape and dimensions, are required to accommodate them. However, such modifications are conventional, and further recitation thereof is not required by one skilled in the art for a full understanding by one of ordinary skill in the art.

Figure 3:
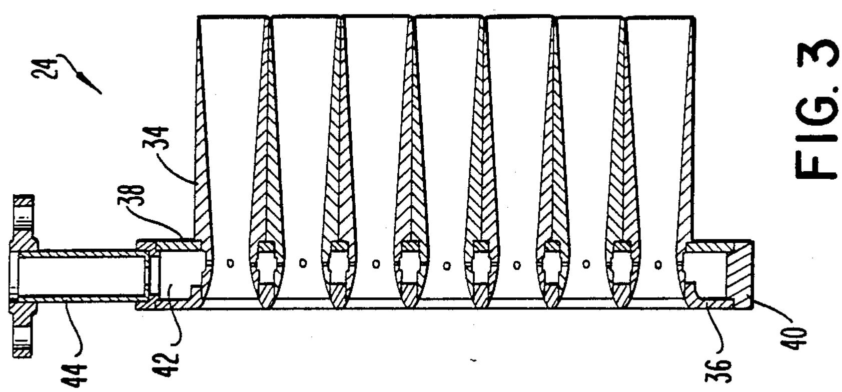
FIG. 3 is a cross section taken along III—III in FIG. 2.
Figure 2:
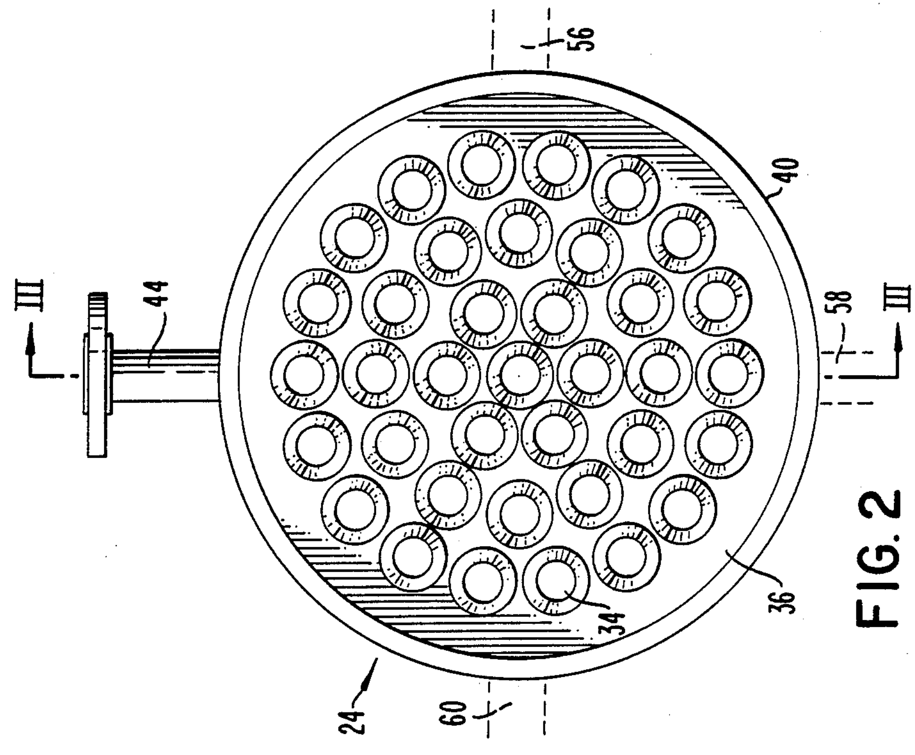
FIG. 2 is an end view of the multiple-venturi tube gas fuel injector of FIG. 1.

Referring now to FIGS. 2 and 3, multiple-venturi tube gas fuel injector 24 includes a plurality of venturi tubes 34 sealably affixed in an upstream header plate 36 by any convenient means such as, for example, brazing. A downstream header plate 38 (FIG. 3) is spaced downstream from upstream header plate 36 and also sealably affixed to venturi tubes 34, also preferably by brazing. A sealing ring 40, brazed about the perimeters of upstream and downstream header plates 36 and 38, forms a sealed fuel gas plenum 42 (FIG. 3) between upstream and downstream header plates 36 and 38 about the perimeters of all venturi tubes 34. Gaseous fuel, under pressure, is fed to fuel gas plenum 42 through a fuel gas supply line 44 into fuel gas plenum 42.

Figure 4:
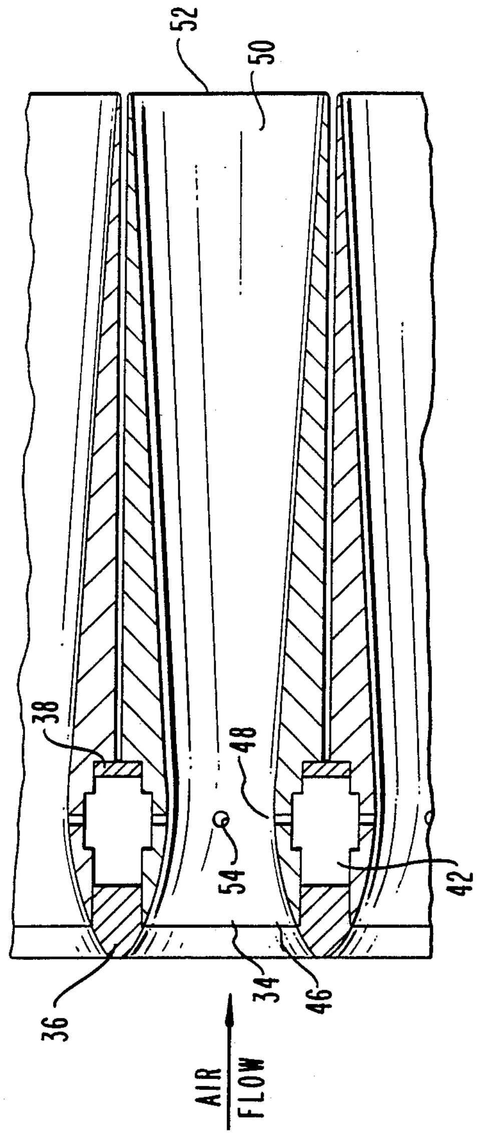
FIG. 4 is a close-up cross section centered on one of the venturi tubes of FIG. 3.

Referring now to FIG. 4, each venturi tube 34 includes an inlet section 46 of decreasing cross section, a throat 48, defining the narrowest cross section, and a diffuser section 50 of gradually increasing cross section, leading to an exit 52. It will be noted that exits 52 of adjacent venturi tubes 34 are as close together as possible. A plurality of orifices 54, suitably four in number, communicate fuel gas plenum 42 with throat 48 of each venturi tube 34.

In operation, an air stream, at times accompanied by products of combustion of preburner section 14, pass from left to right in the FIG. 4, entering inlet section 46 and exiting exit 52. As is well known, a gas passing through a venturi tube is accelerated to a maximum velocity at throat 48 and then is decelerated during its passage through diffuser section 50. A gaseous fuel, injected through orifices 54 into throat 48 at right angles to the high-speed air flow existing there, is subjected to high shear forces and turbulence, effective for producing complete mixing of the fuel gas and air as it exits diffuser section 50.

The mixture exits adjacent exits 52 with substantial kinetic energy and turbulence. This enables mixing of the gas streams from adjacent venturi tubes 34 such that, after travelling to the end of fluid momentum mixing section 26 (FIG. 1), a substantially uniform velocity and fuel-air mixture is attained across the entire flow field as it enters catalyst bed 28. As noted in the description of the background of the invention, an entry gas flow having uniform velocity and fuel-air mixture, as is provided by the present invention, is necessary for efficient operation of catalyst bed 28.

Injection of the fuel gas at right angles to the gas flow in throat 48, places the injection point of the gas fuel at the highest-velocity point in the system upstream of catalyst bed 28. The high air velocity at throat 48 prevents flashback upstream toward preburner fuel nozzle 20, and also avoids flameholding in multiple-venturi tube gas fuel injector 24. It is thus possible to inject a fuel gas into the air stream even when the air stream is heated by operation of preburner fuel nozzle 20 in preburner section 14 during startup without concern for possible flashback. It is likely that the lower air velocity at inlet section 46 would not be high enough to provide a sufficient margin against flashback during all operating condition.

The technology used for fabrication of multiple-venturi tube gas fuel injector 24 closely resembles the conventional technology used in welding boiler tubes into a tube sheet. Thus, fabrication techniques are well in hand to one skilled in the art with the present disclosure for reference.

Referring again to FIG. 2, fuel gas supply line 44 may serve as part of a supporting structure for supporting multiple-venturi tube gas fuel injector 24. Three additional supports 56, 58 and 60, indicated in dashed line, may be provided for additional support of multiple-venturi tube gas fuel injector 24. Although I believe that a single fuel gas supply line 44 is capable of providing a uniform flow of fuel gas to all venturi tubes 34 in multiple-venturi tube gas fuel injector 24, one or more of supports 56, 58 and 60, besides providing support, may also be employed as additional means for feeding fuel gas to multiple-venturi tube gas fuel injector 24.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A fuel injector for a combustor of a gas turbine engine comprising:
- a plurality of venturi tubes disposed in said combustor;
- said plurality of venturi tubes including means for forcing substantially all of an upstream gas flow to pass through said plurality of venturi tubes;
- each of said venturi tubes including a converging inlet section, a throat defining a narrowest portion, and a diverging diffuser section;
- each of said venturi tubes including at least one orifice through a wall of said throat; and
- means for feeding a fuel gas to said at least one orifice, whereby said fuel gas is injected through said wall into said gas flow at said throat.

2. A fuel injector according to claim 1, wherein said at least one orifice is disposed at about 90 degrees to said gas flow through said throat, whereby said fuel gas is injected at 90 degrees to said gas flow.

3. A fuel injector for a combustor of a gas turbine engine comprising:
- an upstream header plate extending across a direction of a gas flow in said combustor;
- a downstream header plate spaced downstream of said upstream header plate;
- a plurality of venturi tubes passing through said upstream and said downstream header plates;
- first means for sealing said plurality of venturi tubes to said upstream and downstream header plates, whereby said gas stream is forced to pass through said plurality of venturi tubes;
- each of said venturi tubes including a throat;
- second means for sealing perimeters of said upstream and downstream header plates together whereby a plenum is formed therebetween surrounding portions of said plurality of venturi tubes;

means for feeding a fuel gas into said plenum; and each of said venturi tubes including at least one orifice between said plenum and a said throat, whereby said fuel gas is injectable through said at least one orifice into said gas stream at said throat.

4. A fuel injector according to claim 3, wherein said at least one orifice includes at least three orifices spaced about a circumference of each of said plurality of venturi tubes.

5. A fuel injector according to claim 3, wherein:

each of said venturi tubes includes a converging inlet section, a throat defining a narrowest portion, and a diverging diffuser section; and said at least one orifice is disposed in said throat.

6. A fuel injector according to claim 3, wherein said first means for sealing includes brazing.

7. A fuel injector according to claim 3 wherein said second means for sealing includes a sealing ring about said perimeters.

8. A fuel injector according to claim 7, wherein said second means for sealing includes brazing between said upstream header plate and said sealing ring and between said downstream plate and said sealing ring.

* * * * *